Dec. 6, 1966 R. W. BOSSE ETAL 3,289,821
RAM-TYPE PUSHER CONVEYOR
Filed Nov. 6, 1964
14 Sheets-Sheet 1
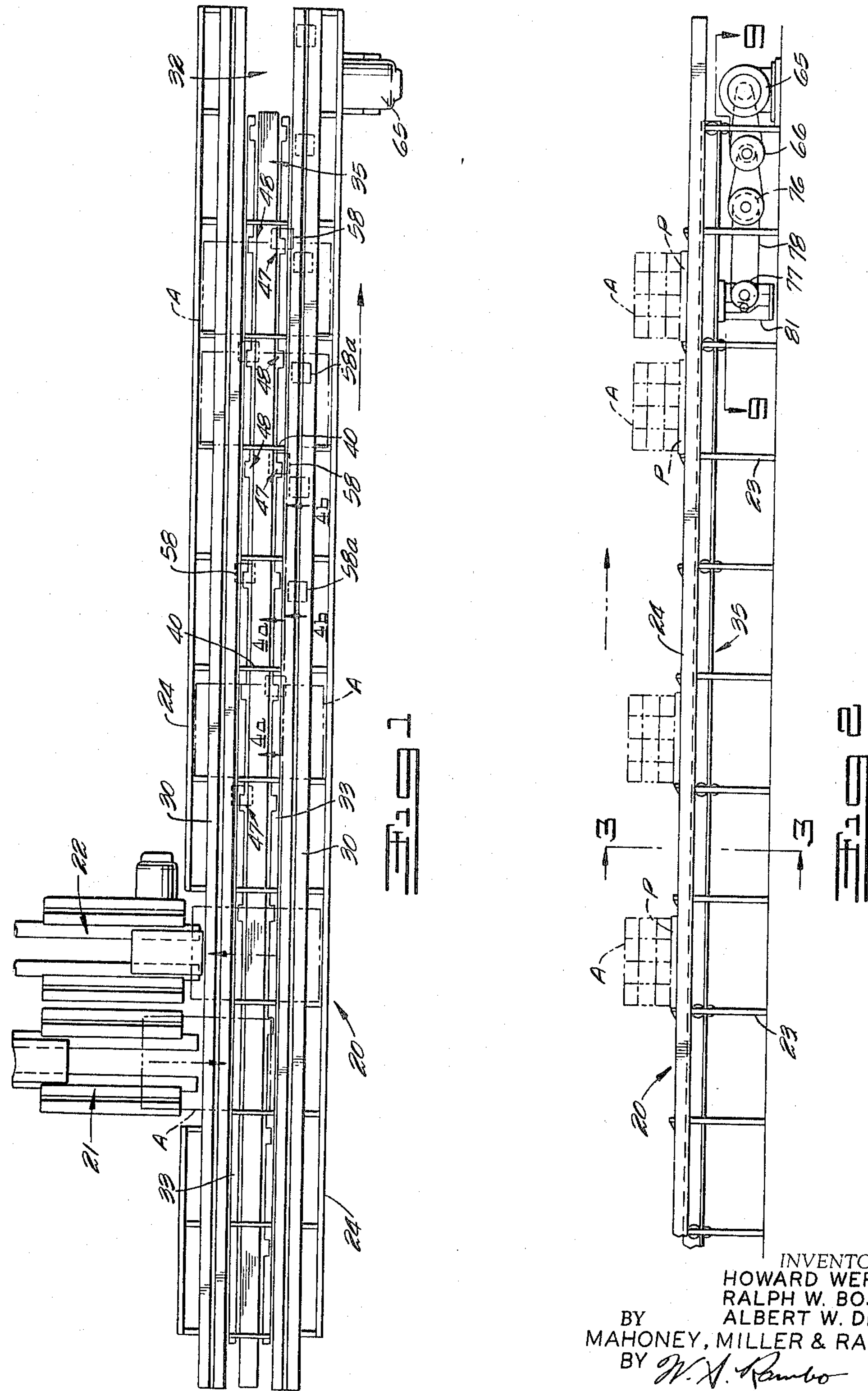
INVENTORS
HOWARD WERLE
RALPH W. BOSSE
ALBERT W. DIXON
BY MAHONEY, MILLER & RAMBO
BY W. H. Rambo
ATTORNEYS

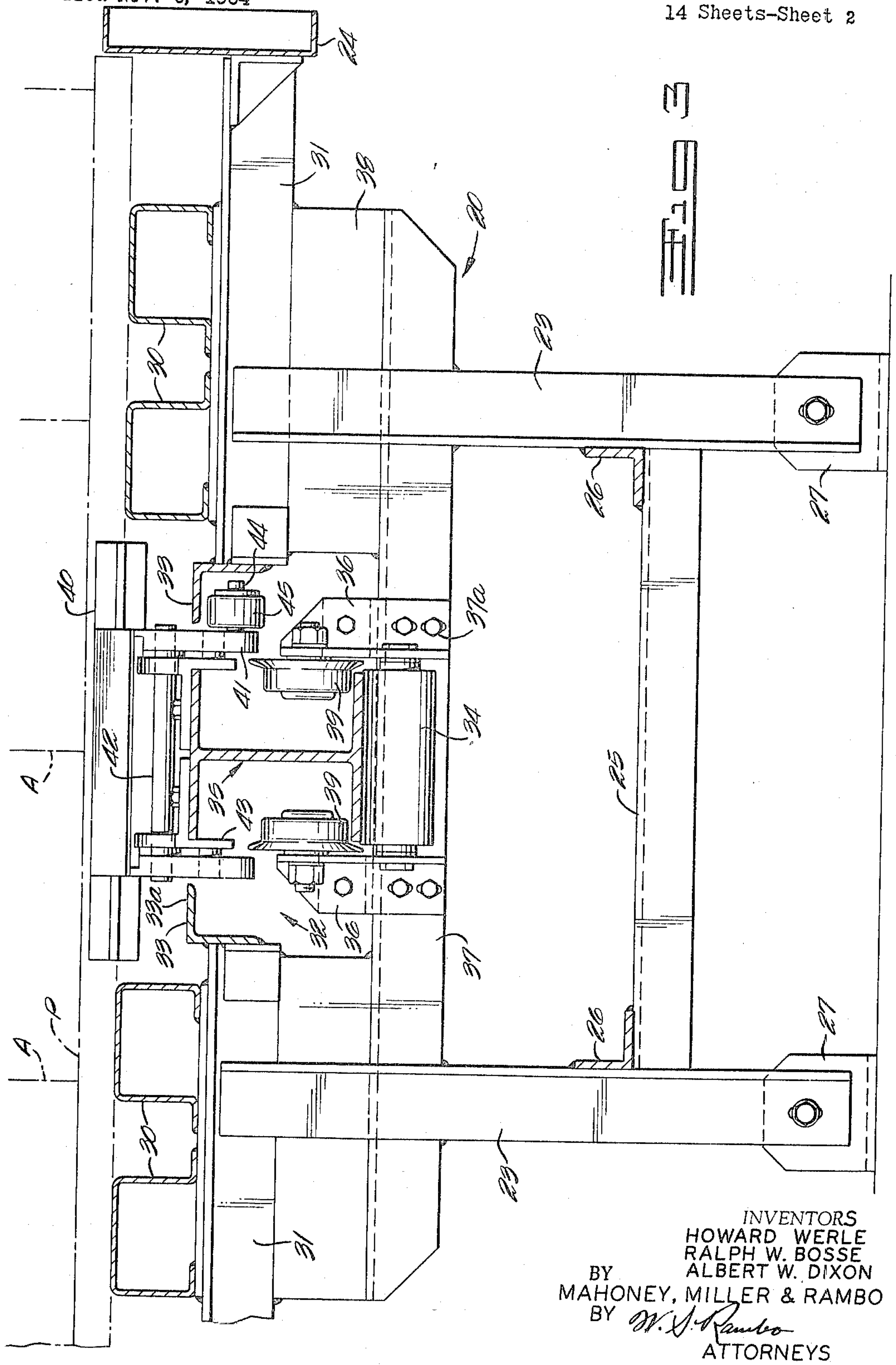
INVENTORS
HOWARD WERLE
RALPH W. BOSSE
ALBERT W. DIXON
BY
MAHONEY, MILLER & RAMBO
BY W. S. Rambo
ATTORNEYS

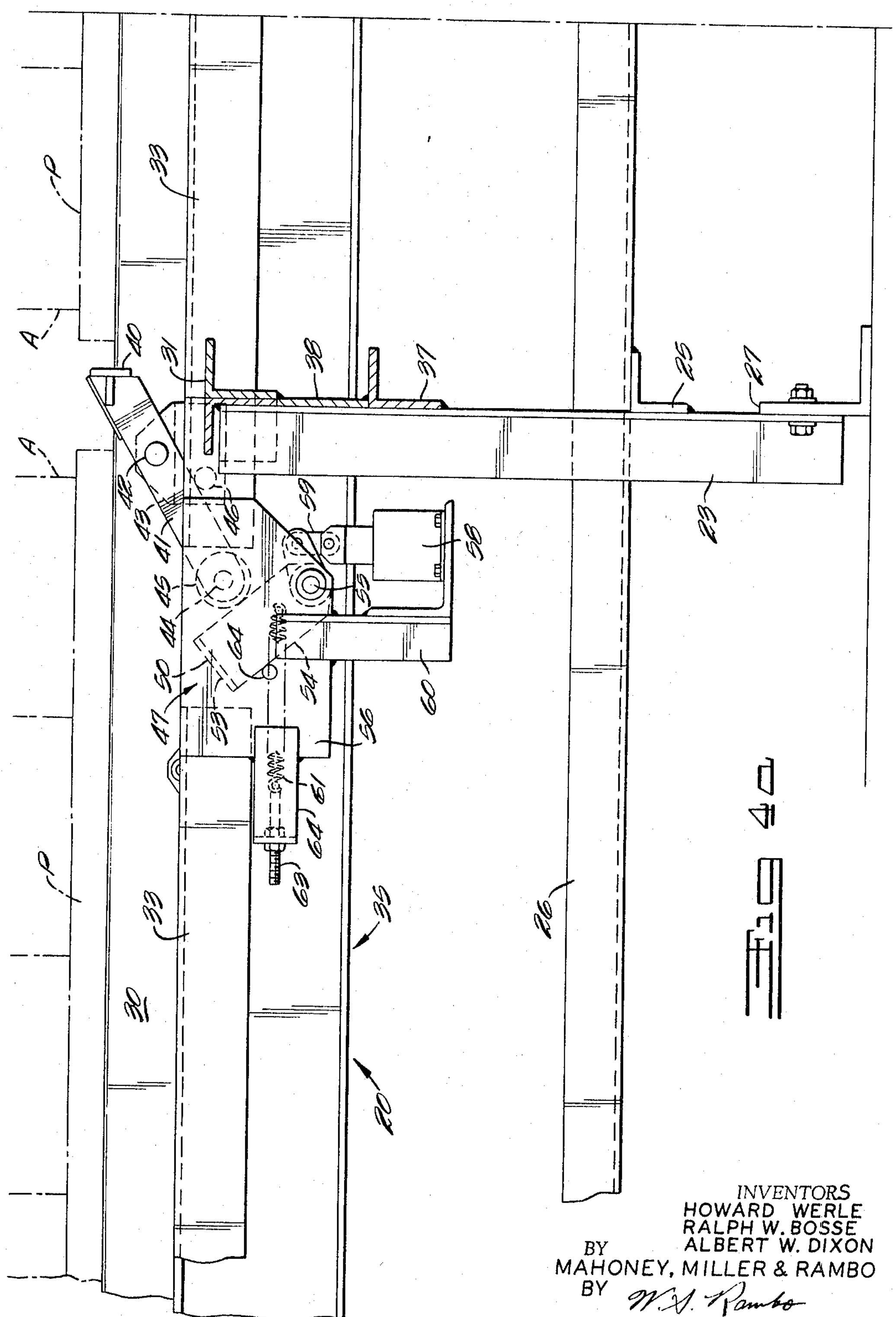
INVENTORS
HOWARD WERLE
RALPH W. BOSSE
ALBERT W. DIXON
BY
MAHONEY, MILLER & RAMBO
BY W. S. Rambo
ATTORNEYS

RAM-TYPE PUSHER CONVEYOR

INVENTORS
HOWARD WERLE
RALPH W. BOSSE
ALBERT W. DIXON
BY MAHONEY, MILLER & RAMBO
BY W. S. Rambo
ATTORNEYS INVENTORS
HOWARD WERLE
RALPH W. BOSSE
BY ALBERT W. DIXON
MAHONEY, MILLER & RAMBO
BY
ATTORNEYS INVENTORS
HOWARD WERLE
RALPH W. BOSSE
ALBERT W. DIXON
BY
MAHONEY, MILLER & RAMBO
BY W. S. Rambo
ATTORNEYS INVENTORS
HOWARD WERLE
RALPH W. BOSSE
ALBERT W. DIXON
BY
MAHONEY, MILLER & RAMBO
BY W. S. Rambo
ATTORNEYS INVENTORS
HOWARD WERLE
RALPH W. BOSSE
BY ALBERT W. DIXON
MAHONEY, MILLER & RAMBO
BY
ATTORNEYS INVENTORS
HOWARD WERLE
RALPH W. BOSSE
ALBERT W. DIXON
BY
MAHONEY, MILLER & RAMBO
BY W. S. Rambo
ATTORNEYS INVENTORS
HOWARD WERLE
RALPH W. BOSSE
ALBERT W. DIXON
BY
MAHONEY, MILLER & RAMBO
BY W. S. Rambo
ATTORNEYS INVENTORS
HOWARD WERLE
RALPH W. BOSSE
ALBERT W. DIXON
BY
MAHONEY, MILLER & RAMBO
BY W. A. Rambo
ATTORNEYS RAM-TYPE PUSHER CONVEYOR
Filed Nov. 6, 1964
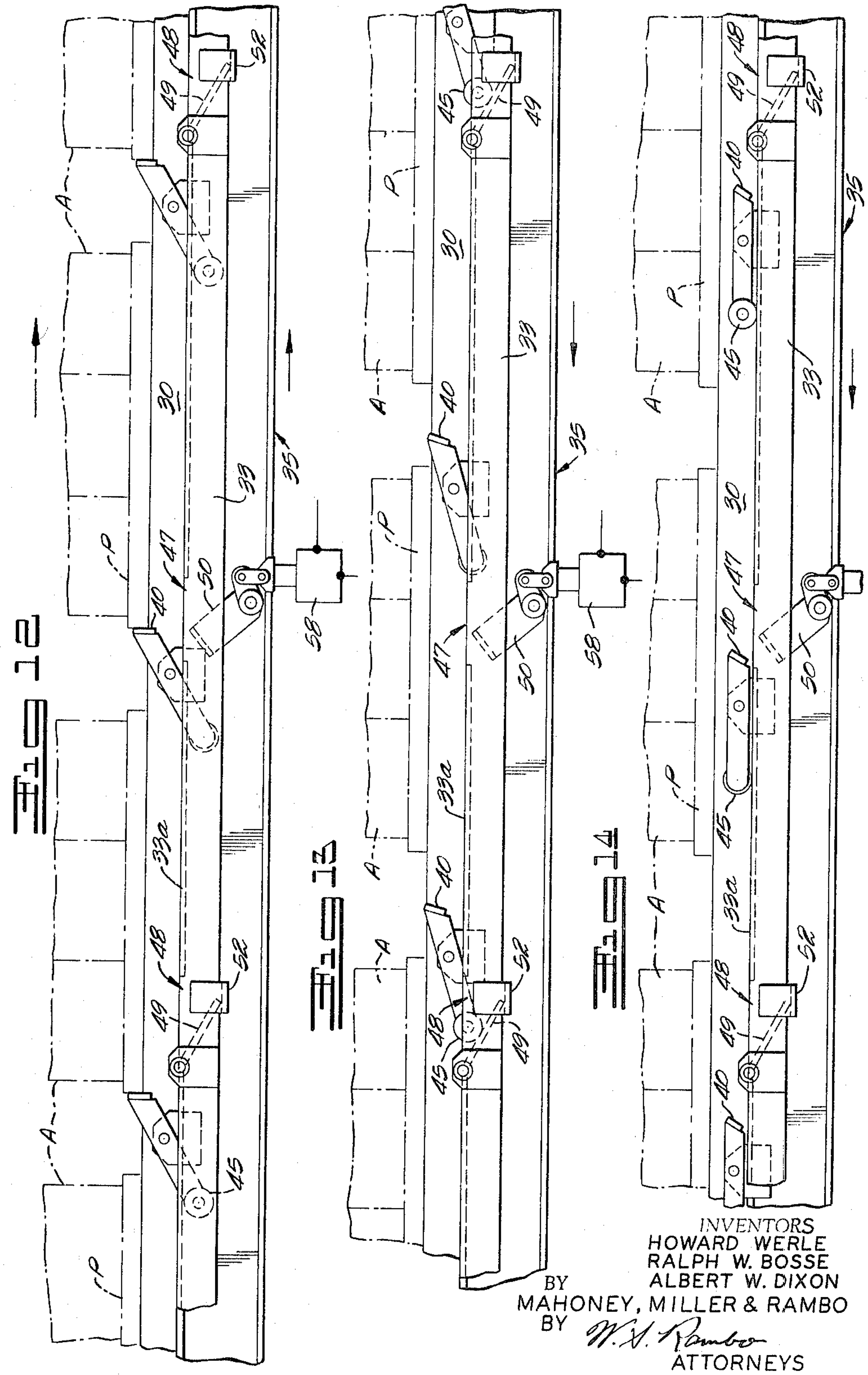
INVENTORS
HOWARD WERLE
RALPH W. BOSSE
ALBERT W. DIXON
BY
MAHONEY, MILLER & RAMBO
BY W. S. Rambo
ATTORNEYS RAM-TYPE PUSHER CONVEYOR
Filed Nov. 6, 1964
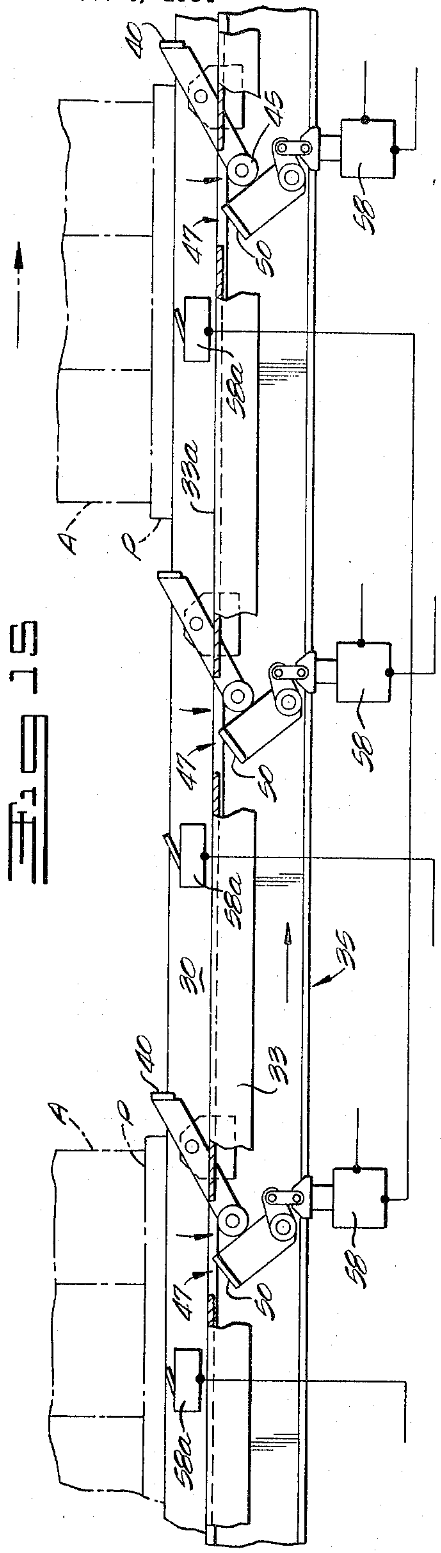
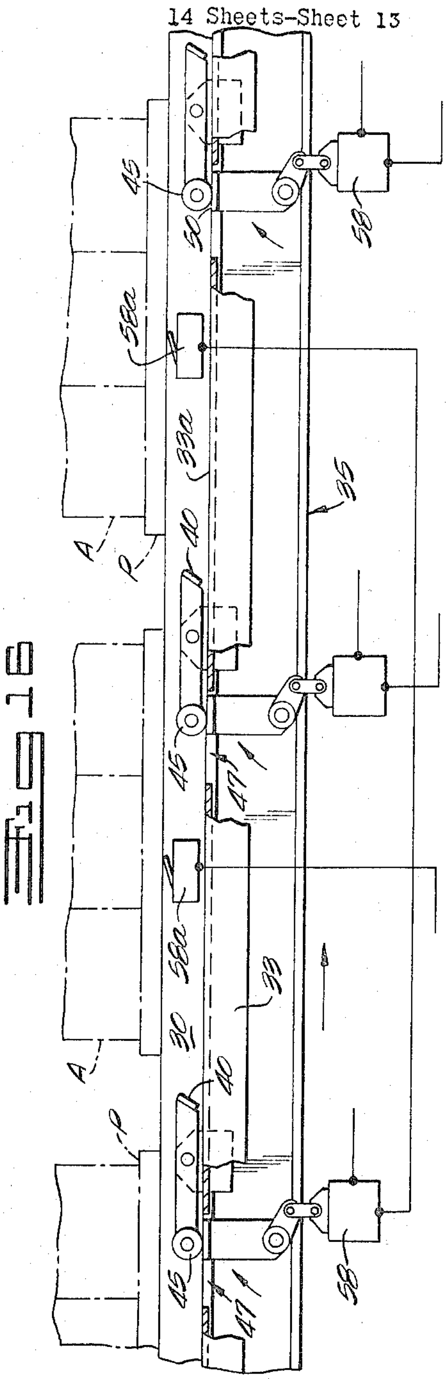
INVENTORS
HOWARD WERLE
RALPH W. BOSSE
ALBERT W. DIXON
BY
MAHONEY, MILLER & RAMBO
BY W. S. Rambo
ATTORNEYS

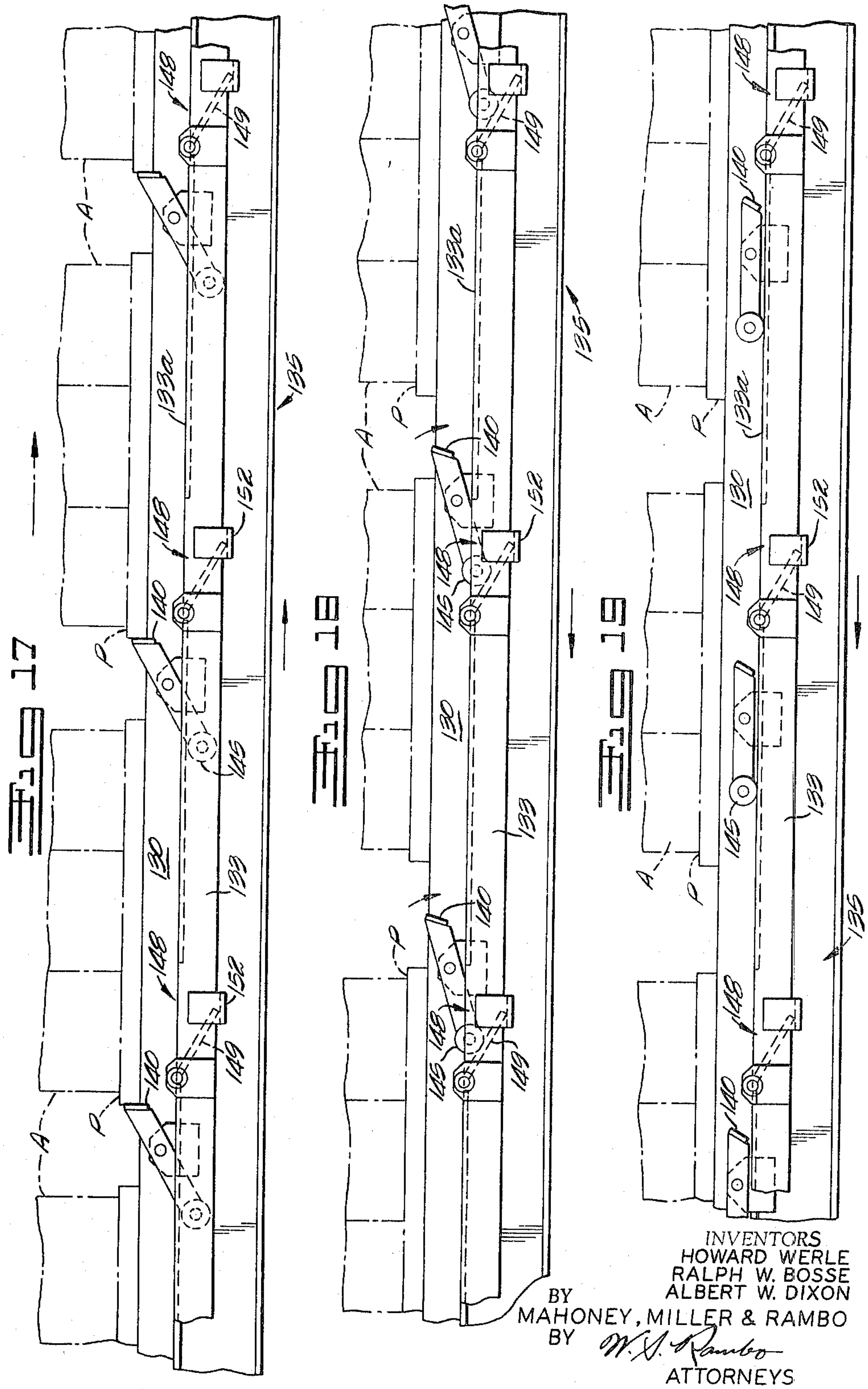
INVENTORS
HOWARD WERLE
RALPH W. BOSSE
ALBERT W. DIXON
BY
MAHONEY, MILLER & RAMBO
BY W. S. Rambo
ATTORNEYS United States Patent Office 3,289,821
Patented Dec. 6, 1966

3,289,821
RAM-TYPE PUSHER CONVEYOR

Ralph W. Bosse, Howard Werle, and Albert W. Dixon, Cincinnati, Ohio, assignors to The Alvey-Ferguson Company, Cincinnati, Ohio, a corporation of Ohio Filed Nov. 6, 1964, Ser. No. 409,530
24 Claims. (Cl. 198—221)

This invention relates to a Ram-Type Pusher Conveyor. It has to do, more particularly, with a conveyor which includes a longitudinally extending supporting structure along which articles are to be moved having mounted in cooperation therewith a reciprocable ram, or a plurality of rams, which has means for properly engaging the supported articles during the forward stroke of the rams to advance the articles along the supporting structure.

According to this invention, the longitudinally-extending, supporting structure may be of any suitable construction and of any suitable length. The articles to be moved along the supporting structure are supplied thereto in a suitable manner. For example, each article to be moved may be a heavy bulky item such as a pile of packed cartons or boxes carried by a pallet, although the articles could be in the form of single cartons or boxes. The supporting structure may be in the form of elongated, parallel, laterally-spaced, horizontal skids or slide members, or groups of successive, transverse rollers, or wheels or combinations of slide members and wheels or rollers, or other elongated supports for supporting the articles and along which they may be moved. The ram, or rams, may be disposed longitudinally between and below the supporting slide members, or their equivalents, and each ram may be in the form of an elongated beam or carriage structure mounted for guided, longitudinally movement. Suitable driving means may be provided for reciprocating the ram back and forth to a predetermined extent. The ram is equipped preferably with pusher bars or dogs which are pivoted thereto on axes transversely thereof adjacent its upper side and which may be actuated to engage simultaneously a series of the slide-supported articles. Means is provided for controlling these pusher bars so that on the advancing stroke of the ram, they engage the articles at their rear edges and move them along the slides but on the returning or retracting stroke of the ram, they move to an inoperative or nonengaging position so as not to contact the articles. With this conveyor arrangement, the articles are transported along the supporting slides under completely controlled conditions imparting a precise amount of movement thereto to transport and index them along the conveyor. Means may also be provided for selectively rendering any one of the pusher bars inoperative as desired so that it will not function to engage the adjacent article even on the advancing stroke of the ram. This will permit the conveyor to function mainly as a transporting conveyor with the capability to move or not move articles selectively as desired, thus permitting control at merge points or discharge points. Also, means may be provided, if desired, for controlling certain pusher bars by sensing devices which are engaged by articles located along the conveyor slides in advance of such bars. These sensing devices may be arranged to accumulate the articles in predetermined spaced relationship along the conveyor.

In the accompanying drawings, there is illustrated a preferred embodiment of the conveyor of this invention.

However, it is to be understood that specific details of this conveyor can be varied without departing from basic principles of the invention.

In the drawings:

FIGURE 1 is a schematic, plan view of the conveyor.

FIGURE 2 is a schematic, side-elevational view of the conveyor.

FIGURE 3 is an enlarged, transverse, vertical, sectional view taken through the conveyor along line 3—3 of FIGURE 2.

FIGURE 4*a* is an enlarged, longitudinal, vertical, sectional view taken along the position indicated at line 4*a*—4*a* of FIGURE 1.

Figure 4B:
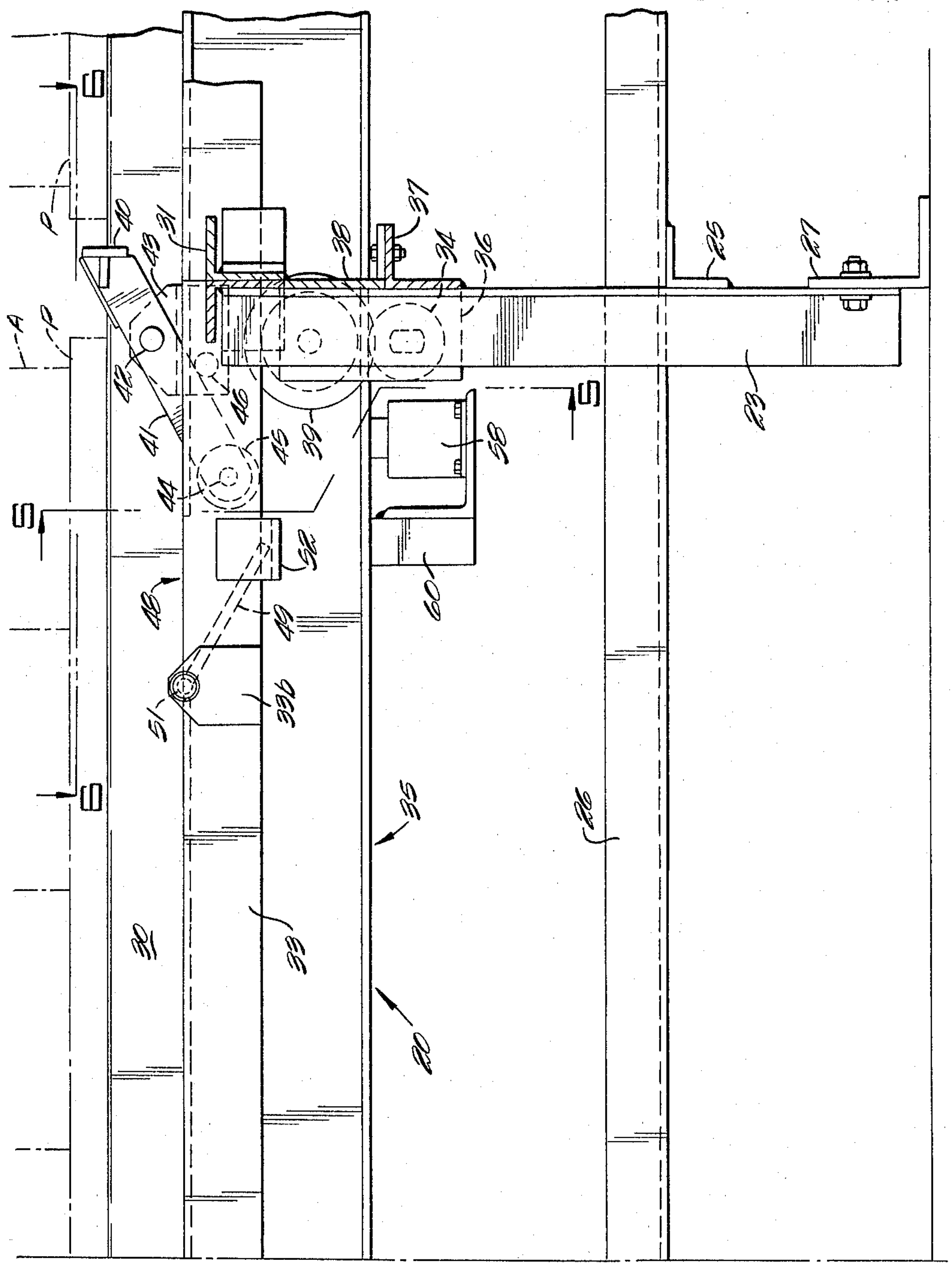

FIGURE 4*b* is an enlarged, longitudinal, vertical, sectional view taken along the position indicated at line 4*b*—4*b* of FIGURE 1 longitudinally adjacent the position of section 4*a*—4*a*.

Figure 5:
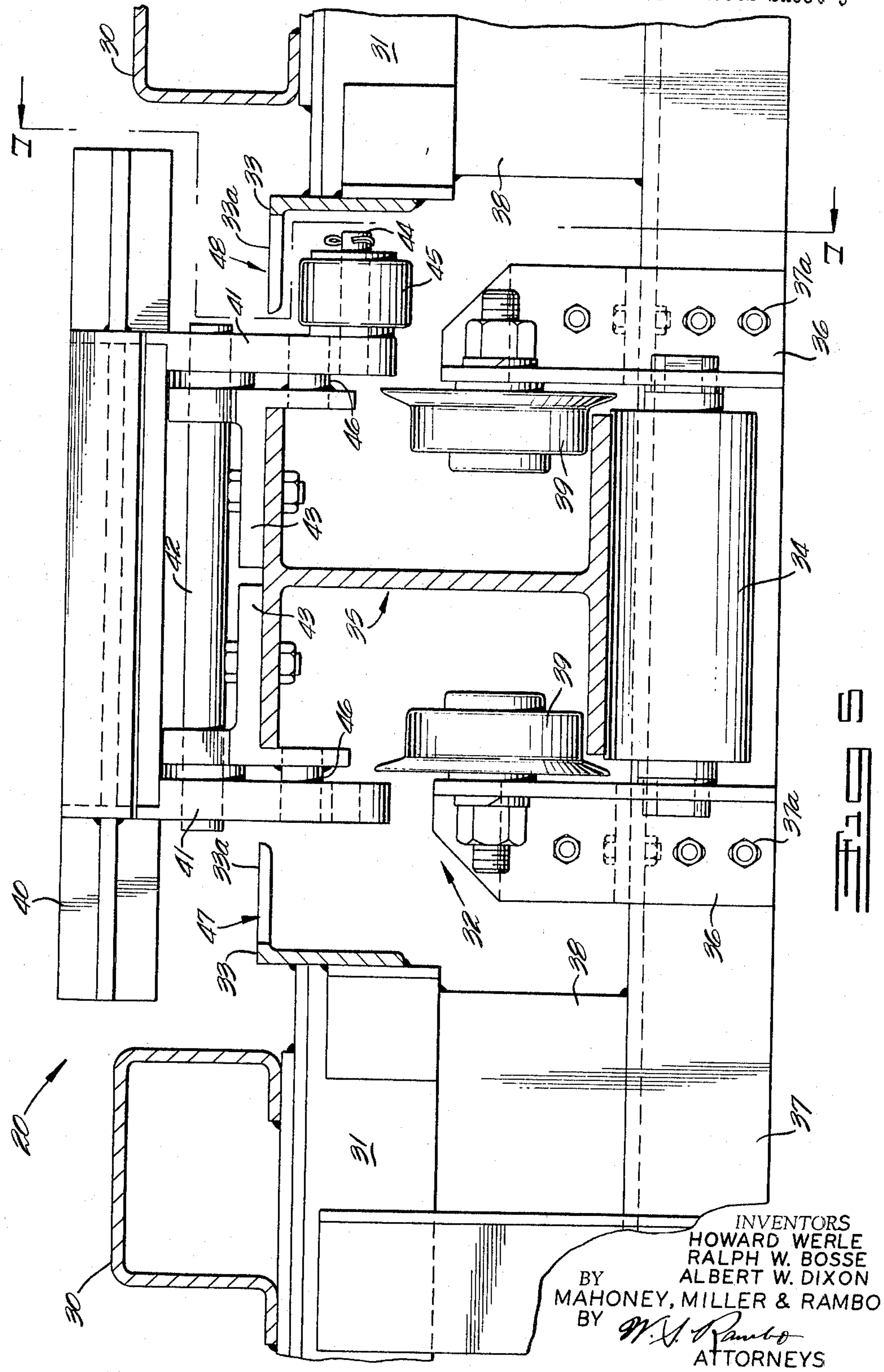

FIGURE 5 is a vertical, longitudinal, sectional view taken along line 5—5 of FIGURE 4*b*.

Figure 6:
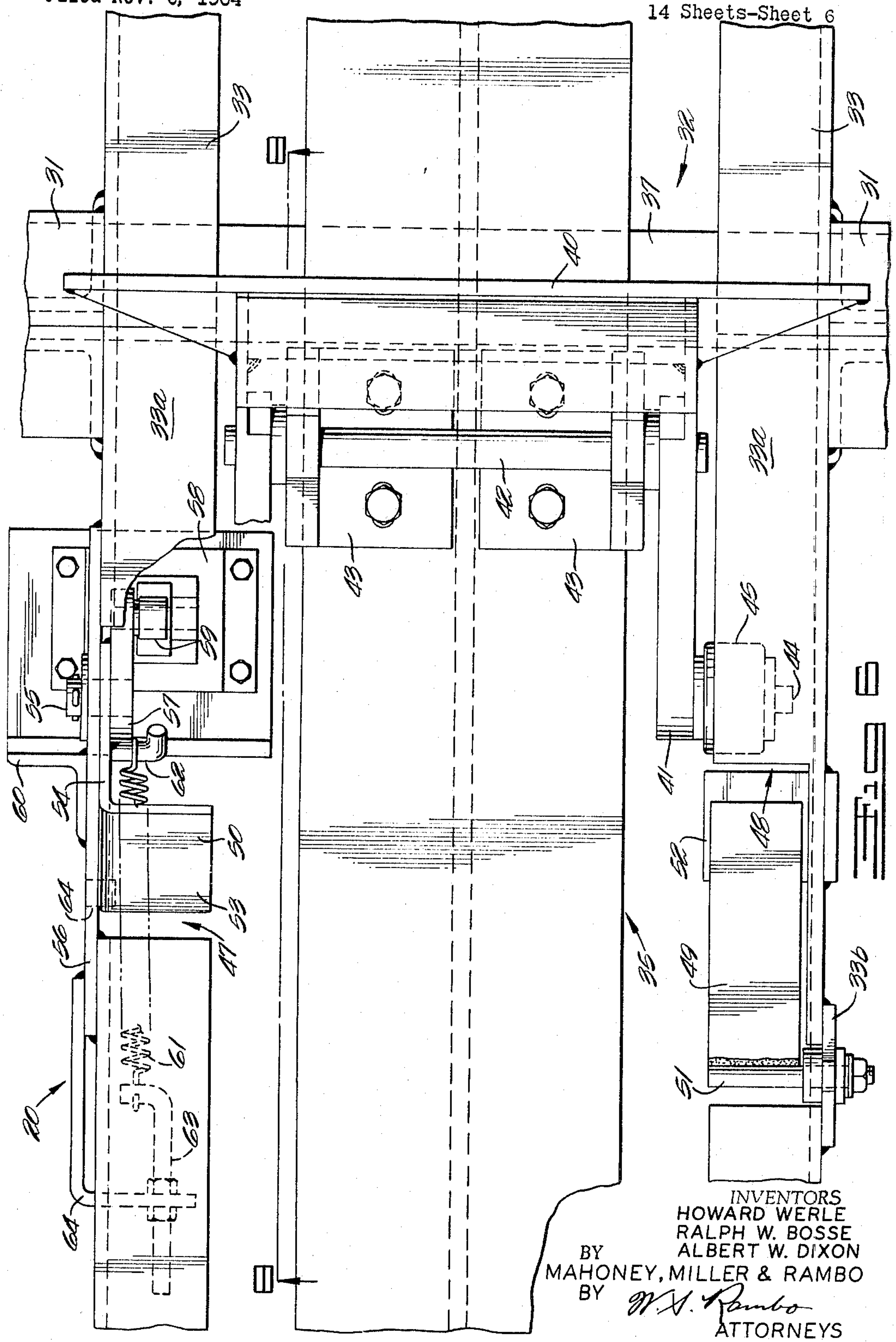

FIGURE 6 is a top plan view taken from the position indicated at line 6—6 of FIGURE 4*b*.

Figure 7:
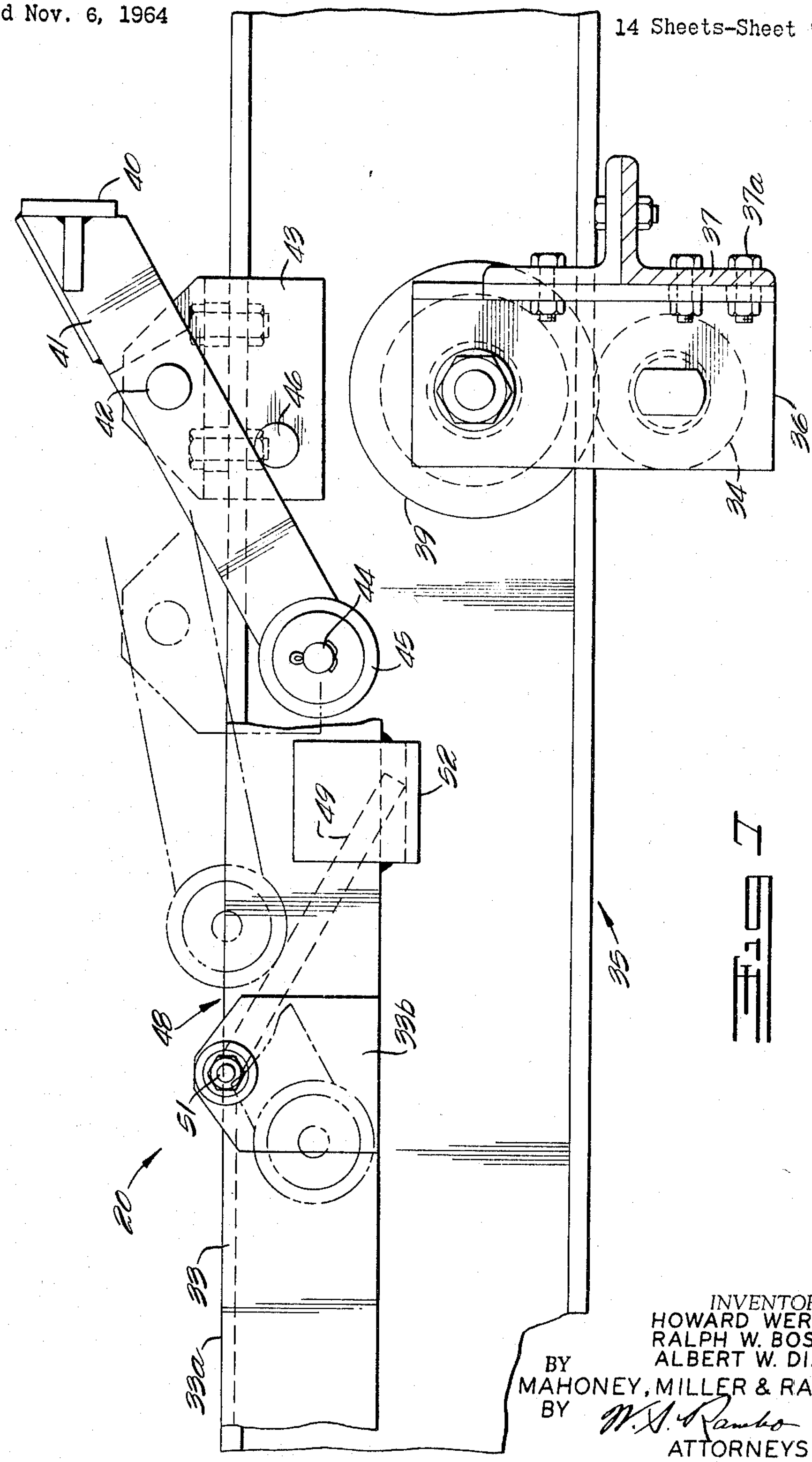

FIGURE 7 is a view, partly in side elevation and partly in vertical, longitudinal section, taken along line 7—7 of FIGURE 5.

Figure 8:
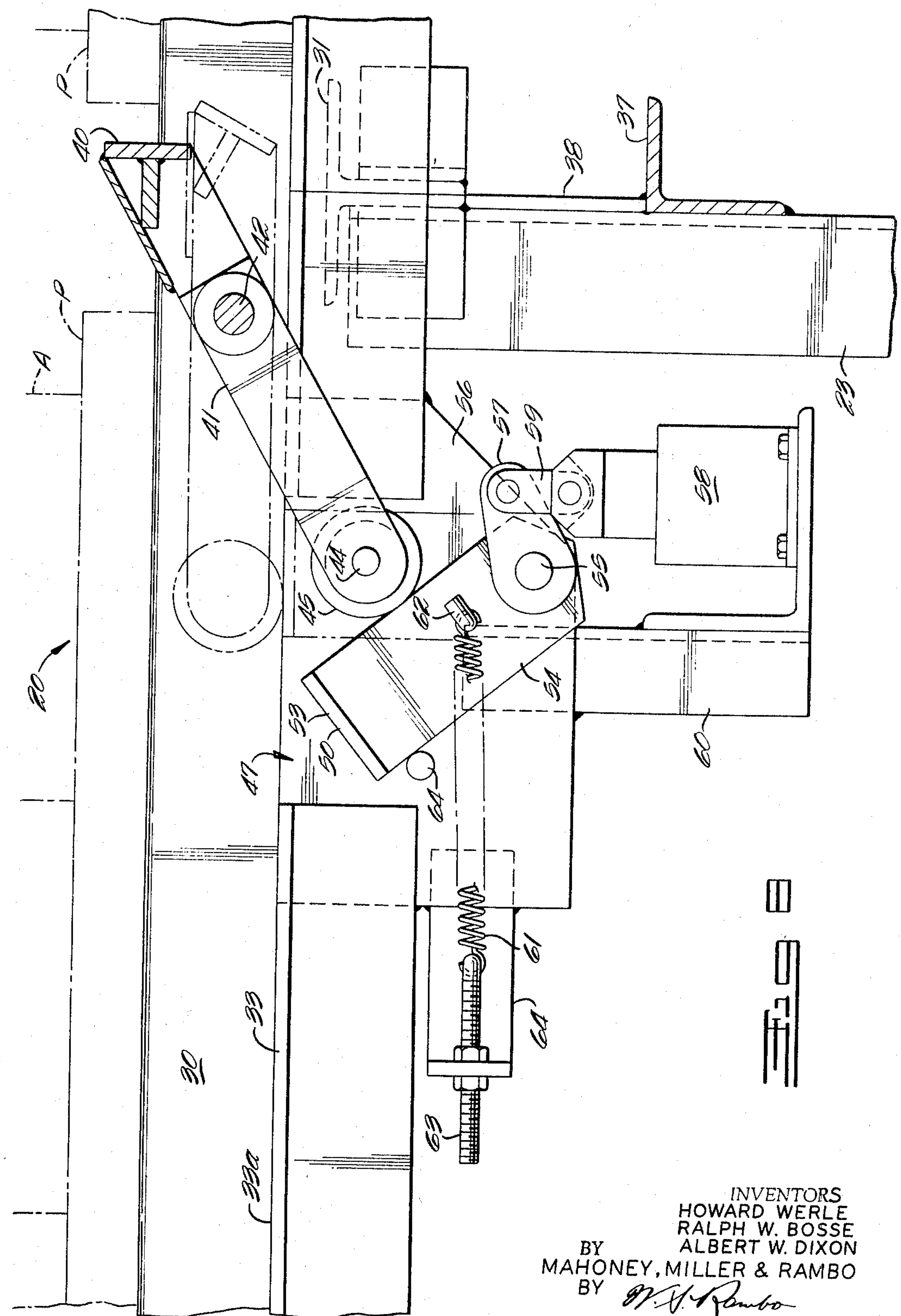

FIGURE 8 is a vertical, longitudinal, sectional view taken along line 8—8 of FIGURE 6.

Figure 9:
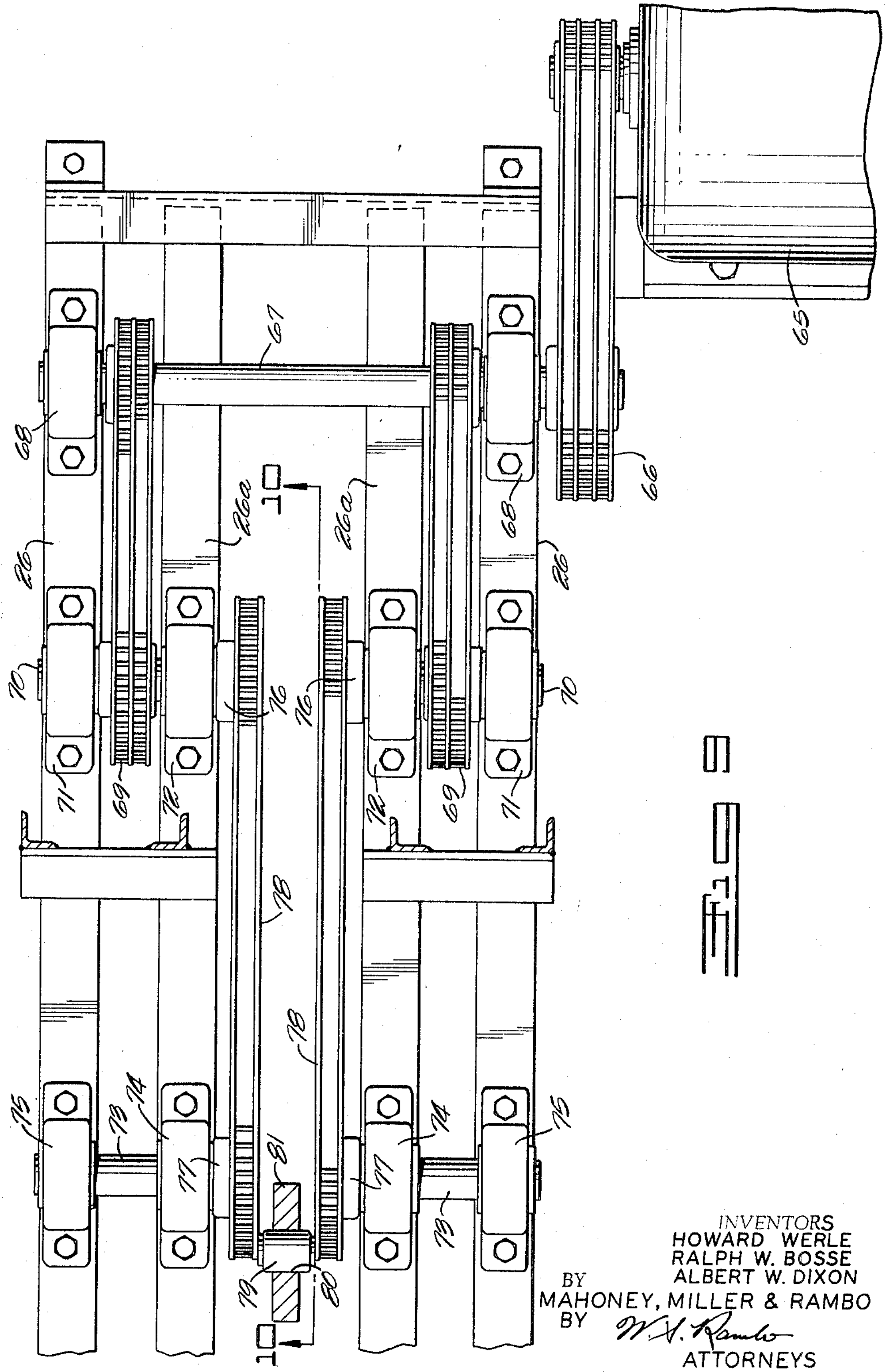

FIGURE 9 is an enlarged, horizontal, longitudinal, sectional view taken along line 9—9 of FIGURE 2 showing the ram driving mechanism.

Figure 10:
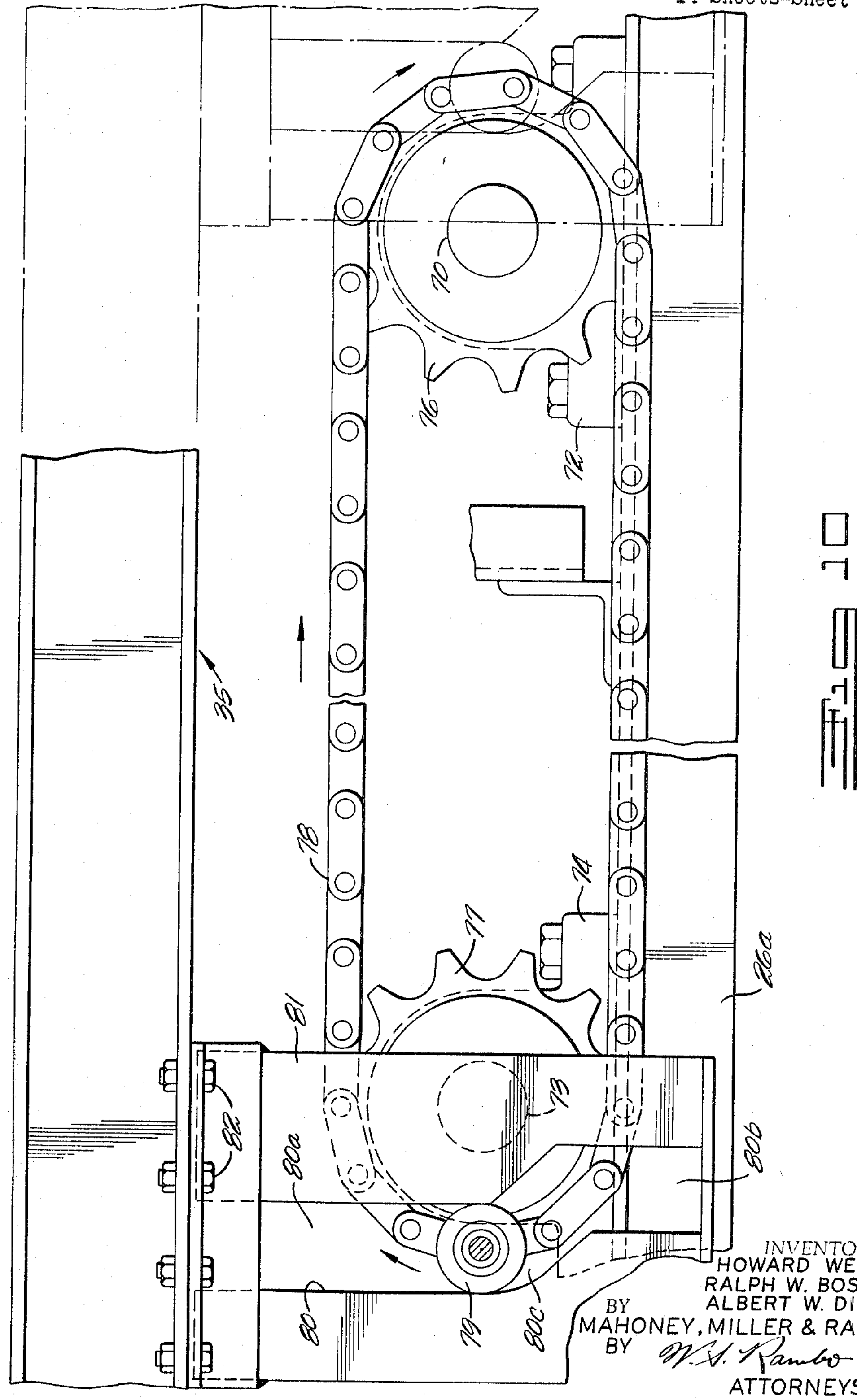

FIGURE 10 is a longitudinal, vertical, sectional view taken along line 10—10 of FIGURE 9.

Figure 11:
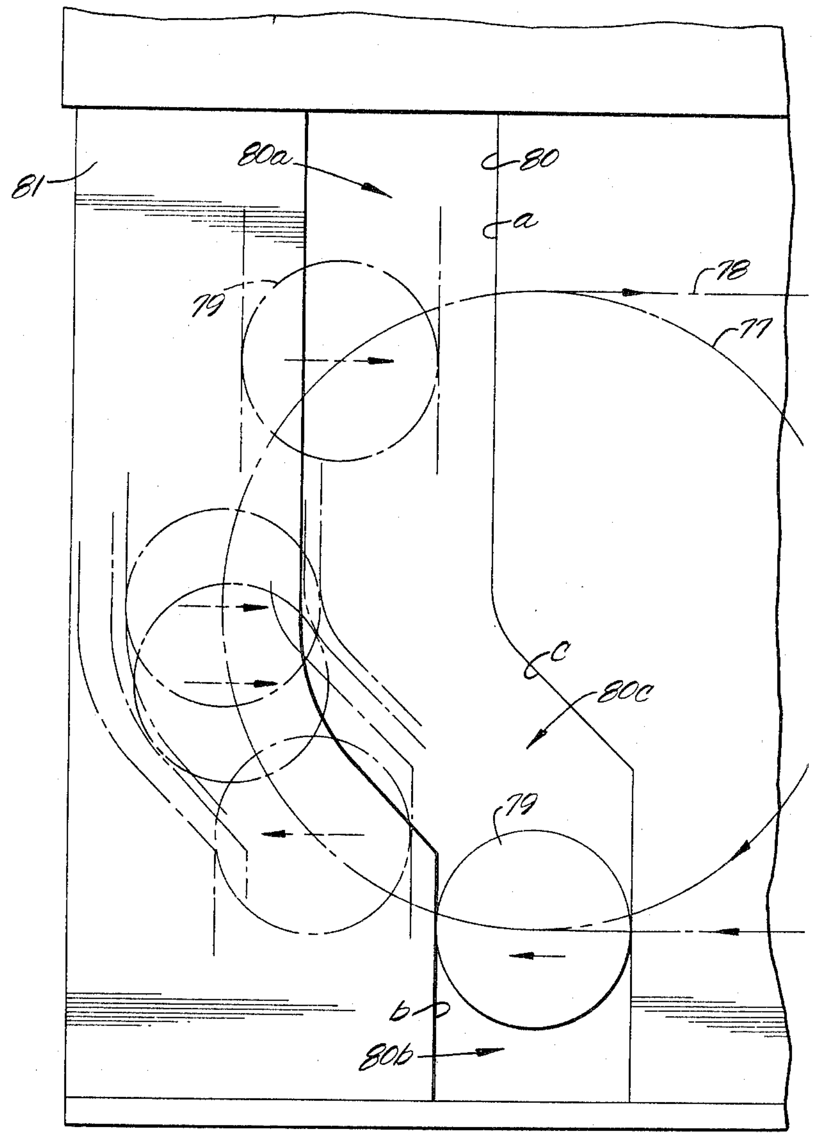

FIGURE 11 is a schematic view illustrating the action of a yoke and cam arrangement of the driving mechanism.

FIGURE 12 is a schematic view showing certain pusher bars carried by the ram in engagement with associated pallets on the advancing stroke of the ram to move them along the supporting slides of the conveyor.

FIGURE 13 is a view similar to FIGURE 12 but showing the pusher bars being moved downwardly out of the plane of the pallets into nonengaging positions during the return or retracting stroke of the ram.

FIGURE 14 is a view similar to FIGURE 13 but showing the pusher bars in inoperative or nonengaging positions where they will not engage the pallets during the retracting stroke of the ram.

FIGURE 15 is a schematic view showing the action of an arrangement for selectively preventing upward movement of the pusher bars into engagement with the pallets, the arrangement being shown in inoperative condition.

FIGURE 16 is a view similar to FIGURE 15 but showing the arrangement functioning to keep the pusher bars in lower nonengaging positions.

FIGURE 17 is a schematic view similar to FIGURE 12 but illustrating a modification of the conveyor, the pusher bars thereof being shown in engagement with associated pallets on the advancing stroke of the ram.

FIGURE 18 is a view similar to FIGURE 17 but showing the pusher bars moved downwardly out of the plane of the pallets during the return or retracting stroke of the ram.

FIGURE 19 is a view similar to FIGURE 18 but showing the pusher bars in inoperative positions or positions where they will not engage the pallets during the retracting stroke of the ram.

With reference to the drawings, in FIGURES 1 and 2 there is illustrated schematically the general arrangement of a section or segment of a conveyor system in which this present invention is embodied. However, it is to be understood that other conveyor arrangements can be provided and that this is by way of example only. In general, the conveyor system is shown as comprising an elongated main conveyor 20 which extends the desired distance and which may have associated therewith conveyors 21 and 22 disposed at suitable locations along the main conveyor at right angles thereto. These conveyors 21 and 22 may be of any suitable type and may even be of the same type, or modifications thereof, as the main conveyor 20. They will be controlled in conjunction with the main conveyor 20 to transfer goods to and from the main conveyor but the structure and controls of these conveyors 21 and 22 is not important to the present invention claimed herein.

The main conveyor 20 comprises an elongated article-supporting, horizontally-disposed frame which includes the longitudinally-extending main side guards 24 and which is carried at a suitable level by the legs 23 disposed in pairs of transversely aligned legs, the pairs being located at suitable longitudinally-spaced intervals under the frame. It will be noted from FIGURES 3, *4a* and *4b* that the legs 23 of each pair may be braced toward their lower ends by transverse braces 25 and that longitudinally-extending, angle-iron braces 26 may be provided between the adjacent pairs of legs resting on the braces 25 and being suitably secured thereto and to the legs 23. Also, if desired, the lower ends of the legs 23 may carry relatively vertically-adjustable, leveling and supporting feet 27.

The articles A to be moved along the conveyor may be of various types but are illustrated as being in the form of stacks of cartons or boxes carried on pallets P. However, the conveyor of this invention is not limited to the handling of any particular type of article.

For supporting the articles for movement along the conveyor, as indicated, various arrangements may be provided, such as slides, skids, wheels or rollers, or combinations thereof, but in the present example slides are illustrated for this purpose. These slides are indicated at 30 and are disposed outboard on the conveyor frame and extend the full length thereof. They are shown as being four in number in FIGURES 1 and 3, with two being located at each side of the center line of the frame but any suitable number and arrangement may be provided. They are all disposed in predetermined laterally-spaced, parallel relationship and parallel to the side guard members 24 which are disposed outboard thereof. Each slide 30 is shown as being formed of sheet steel of substantially inverted U-shape cross section (FIGURE 3) with attaching flanges at their lower edges that are secured as by bolting or welding to horizontally disposed, transverse frame members 31. These frame members are relatively short being provided in groups at each side of the center line of the conveyor with their inner, opposed ends spaced apart to provide a longitudinally-extending space or channel 32 (FIGURE 1) extending the full length of the conveyor and adapted to receive the article-moving ram, in a manner to be described, the ram being indicated generally by the numeral 35. Each group of transverse support members 31 at each side of the conveyor center line comprises members spaced longitudinally the same as the legs 23 and being welded or otherwise secured to the upper ends of the respective legs. The inner ends of these groups of transverse frame members 31 carry roller guide rails or tracks 33 in the form of angle members which extend parallel with the side guard members 24 and slides 30. These angles members 33 each have one of their flanges vertically disposed and secured rigidly, as by bolting or welding, to the adjacent inner ends of the transverse members 31 and have the other of their flanges inwardly directed. Thus, rails 33 are provided along opposite sides of the ram-receiving channel 32 with their respective horizontal flanges 33*a* directed inwardly toward each other.

As previously indicated, the ram 35 is reciprocably mounted in the elongated space or channel 32 in the conveyor frame. The frame is preferably of a length sufficiently greater than that of the elongated ram to allow for the stroke of the ram without having it project from the opposite ends of the channel 32, as indicated in FIGURES 1 and 2. The ram, as indicated best in FIGURES 3 and 5, is preferably in the form of a heavy I-beam cross section with its web vertical and its flanges in upper and lower horizontal positions. However, it is to be understood that the ram could be of other types of sections or structures, such as a carriage, and more than one could be used although a single beam-type ram is given as an example. The I-beam ram 35 is supported on the conveyor frame for reciprocation in the channel 32 by means of the antifriction rollers 34 upon which the lower flange rests. These rollers are disposed transversely of the channel 32 and are arranged at suitable longitudinally-spaced intervals which may correspond to the locations of some of the pairs of supporting legs 23. Each roller 34 is carried rotatably between the lower ends of upstanding angle brackets 36 which are secured in laterally-spaced relationship to an associated transverse brace 37 for relative vertical adjustment, as by bolt and slot connections 37*a*. The brace 37 extends transversely beyond the legs 23 of a cooperating pair and is welded or otherwise rigidly secured thereto at a proper level just below the level of the slide-supporting braces 31. For added rigidity, a gusset plate 38 may be secured between each outer end of the brace 37 and the brace 31 thereabove. Thus, the ram beam 35 is suspended for reciprocation from the main frame of the conveyor, resting and moving on the transverse rollers 34.

Additional guide rollers 39 are provided for cooperating with the lower flange of the ram. These rollers are provided in pairs, each pair comprising two axially-aligned rollers disposed above an associated roller 34 and carried by the same pair of brackets 36 adjacent the upper ends thereof. These rollers are preferably flanged rollers with the flanges thereof extending downwardly over the edges of the lower flange of the ram, as shown best in FIGURE 5, to serve as lateral guides for the ram as well as hold-down rollers.

The upper side of the ram pivotally carries article-engaging units in the form of dogs or pusher bars 40 which are transversely disposed relative thereto. These pusher bars 40, as previously indicated, are designed to engage the articles supported on the slides 30 and to move them along the slides during the forward or advancing stroke of the ram. The bars 40 are provided in suitable number and are located at predetermined spaced intervals along the upper flange of the ram beam, being spaced apart at intervals a greater distance than the length of the articles being handled. The details of these pusher bars are illustrated best in FIGURES 3–8.

Each pusher bar 40 is carried by a pivoting yoke structure 41, the legs of which straddle the upper flange of the ram beam 35 (FIGURE 5) extending downwardly between the edges of that flange and the adjacent parallel edges of the inwardly-directed flanges 33*a* of the associated rails 33. It will be apparent from this figure that when the ram beam 35 is resting on the supporting rollers 34, the upper flange of the ram 35 and the horizontal flanges 33*a* are in the same horizontal plane and the hold-down and guide rollers 39 are spaced slightly above the lower flange of the ram. The legs of the yoke 41 are mounted for swinging movement on the oppositely extending ends of a pivot pin 42 which extends transversely over the upper flange of the ram and is mounted thereon by means of lugs upstanding from a pair of brackets 43 which are bolted to that flange. The inner or lower end of one of the legs of the yoke carries a roller axle 44 which is directed laterally outwardly and which carries a pusher-bar control roller 45. This roller 45 is adapted to cooperate with the inwardly-directed flange 33*a* of the associated rail 33, as will later appear. Thus, each pusher bar is controlled by a single roller 45 but as will be apparent later, the rollers 45 of successive pusher bars are carried by alternating legs of the respective yokes so that successive rollers will be cooperating with the guide rails 33 at opposite sides of the ram. Since only one leg of each yoke structure 41 is used in mounting the control roller, it would be possible to eliminate one of these legs but for simplicity, to avoid left and right roller mounting structures, yokes are used.

It will be noted (FIGURE 5) that each pusher bar 40 itself is of greater length than the span of the yoke 41 and extends almost the full width of the space between the two innermost slides 30 extending over the two opposed rails 33. The pusher bar presents a forward, flat-article-engaging face. The weight of the roller 45 and the portions of the arms of the yoke 41 behind the pivot pin 42 (to the left of the pin in FIGURE 4*a*) is such that they overcome the weight of the bar and the portions of the yoke ahead of the pivot pin (to the right of the pin) to lift the bar 40 to its uppermost position which is indicated in FIGURES 4*a* and 4*b*. To limit this upper position of the pusher bar to a level where its face will be vertical and will be substantially in the plane of the pallets P supported on the slides 30, stop pins 46 are provided for engaging the respective arms of the yoke behind the pivot 42 at their lower edges. These pins are carried by and project laterally outwardly from depending portions of the brackets 43 (FIGURE 5) which carry the pivot pin 42. Thus, the roller-carrying end of the yoke 41 will normally drop downwardly until it strikes the pins 46, at which time the face of the pusher bar will be vertical and will be at a proper level to engage the proper pallet P. At this time, the roller 45 will be at a level below the associated horizontal rail flange 33*a*.

As previously indicated, the rails 33 cooperate with the associated rollers 45 in controlling vertical movement of the pusher bars 40 between pallet-engaging and pallet-nonengaging positions. These rails extend almost the full length of the slides 30 and just slightly less than the length of the ram 35, as indicated in FIGURE 1. At regular longitudinally-spaced intervals, the horizontal flange 33*a* of each of the opposed rails 33 is cut away to provide the alternating notches 47 and 48. These notches are of sufficient extent to permit the rollers 45 to pass vertically therethrough at times and are spaced longitudinally in the respective rail flanges 33*a* in a predetermined manner. In the example shown, the notches 47 and 48 in each rail alternate with each other and the notches 47 of one rail are substantially opposite but not in alignment with the notches 48 of the other rail, as indicated in FIGURES 1 and 6. Also, the notches 48 are of greater longitudinal extent than the notches 47, as indicated best in FIGURE 6.

Associated with each of the notches 48 is a pivoted switch or ramp 49 which normally aids in controlling the vertical movement of the associated pusher bar 40 to position it above and below the cooperating rail flange 33*a* in accordance with the stroke of the ram 35. Associated with each of the notches 47 is a pivoted gate or rail section 50 which normally is inoperative but may be selectively moved into position to prevent the cooperating control roller 45 of an associated pusher bar 40 from dropping through the adjacent notch 47 during reciprocation of the ram thereby rendering that pusher bar completely inoperative to engage a pallet. Thus, along each rail 33 the members 49 and 50 are arranged in alternating relationship and on the opposed rails the units 49 and 50 are respectively opposite each other. With this arrangement, the successive rollers 45 at one side of the ram, for example, will control the even-numbered successive pusher bars 40 whereas at the other side of the ram, the successive rollers 45 will control the odd-numbered successive pusher bars and the rollers alternate to make proper contact with the side rails 33. The reason for alternating the control rollers 45 on first one side and then the other of the pivoted pusher bars 40 is to reduce to a minimum the possible spacing of the pusher bars. If the units 49 and 50 were all on the same side, considerably more longitudinal space would be required along the guide rails and, therefore, between the pusher bars to accommodate these units.

The pivoted ramp 49 is illustrated best in FIGURES 4*b*, 6 and 7 and comprises a flat plate which is substantially of the width of the flange 33*a* of the associated rail 33 and which is pivoted at its rear end by means of a pivot pin 51 mounted on the rail 33 by means of a bracket 33*b*, welded or otherwise secured to the vertical flange of the rail, and projecting horizontally inwardly from the rail at the level of the flange 33*a*. This ramp 49 is of a length just slightly less than the length of the associated notch 48 (FIGURE 6) and its free forward end will normally drop down onto a laterally-extending stop lug support 52 which is welded or otherwise secured to the vertical flange of the rail 33 and extends inwardly therefrom. It will be noted from FIGURE 6 that the forward edge of this flange 52 is spaced just behind the forward extremity of the notch 48. Thus, normally, as shown in FIGURE 7, the ramp 49 will be in a downwardly and forwardly inclined position.

The structure of each of the pivoted gate or rail sections 50, associated with each notch 47, is illustrated in FIGURES 4*a*, 6 and 8. The rail section comprises a supporting flange 53 which extends laterally inwardly from a rocker arm support 54 that is located just inside the vertical flange of the associated guide rail 33. This arm 54 has its lower end carried on a rock shaft 55 which is mounted in a bearing carried by an upright plate 56 which depends from the vertical flange of the associated rail 33. Also fixed on this rock shaft 55 is a crank arm 57. This crank arm can be rocked about the axis of the shaft 55 by means of a solenoid 58 which is connected thereto by a pivoted link 59. The solenoid 58 is carried by a bracket 60 which is supported from the plate 56 and may be welded thereto in depending relationship thereto. The arm 54 is normally swung rearwardly by means of a tension spring 61 which is connected at its forward end, as indicated at 62, to the arm, above the shaft 55, and which is anchored at its rear end by an adjusting screw 63 to a bracket 64 extending rearwardly from the plate 56 and to which it may be welded. Thus, normally the arm 54 is swung rearwardly, as indicated in FIGURE 8, and the rail flange section 53 will be rearwardly positioned toward the rear end of the notch 47 and it will be stopped in this position by a stop pin 64 projecting inwardly from the plate 56. However, when the solenoid 58 is actuated, the arm 54 will be rocked forwardly and the flange 53 carried thereby will be brought to the forward end of the notch 47 where it will be level with and a rearward continuation of the flange 33*a* ahead of the notch.

As previously indicated, the ram 35 is mounted in the channel 32 in the upper side of the conveyor frame on the supporting rollers 34 for longitudinal reciprocation and during this reciprocation, vertical swinging movement of the pusher bars 40 is controlled. According to this invention, a special drive arrangement is provided to reciprocate the ram and this drive imparts controlled acceleration and deceleration to the ram movement.

This special drive is a modified crank and slotted crosshead or Scotch yoke type and is illustrated in FIGURES 1, 2 and 9–11, inclusive. It is located at one end, the forward end, of the conveyor frame beneath the level of the ram and includes an electric drive motor 65. This motor drives by a multiple roller chain sprocket drive 66 (FIGURE 9) a transverse jack shaft 67 that is carried by bearings 68 supported by the lower longitudinal frame braces 26 at a level below the level of the ram-supporting rollers 34. The shaft 67 drives a pair of multiple-roller chain sprocket drives 69, each of which extends rearwardly longitudinally and drives a stub sprocket shaft 70. Each shaft 70 is in axial alignment with the other shaft 70 on a common axis, parallel to the axis of the shaft 67, and each shaft 70 is rotatably mounted in bearings 71 and 72 carried by the respective longitudinal frame braces 26 and **26*a*. Spaced longitudinally rearwardly from each sprocket shaft 70 and parallel thereto is another stub sprocket shaft 73 which is rotatably mounted in bearings 74 and 75 carried by the respective frame braces 26 and 26*a*. The opposed axially-aligned sprocket shafts 70 carry on their adjacent inner ends the sprockets 76, which are keyed thereto, and the opposed axially-aligned sprocket shafts 73 carry on their adjacent inner ends the sprockets 77 which are keyed thereto. Each pair of longitudinally-spaced sprockets 76 and 77 has an endless roller chain 78 passed therearound and in engagement therewith. Thus, the pair of sprocket chains 78** are laterally spaced and coextensive in length.

Between the pair of laterally-spaced chains 78 there is mounted for traveling movement therewith in a vertical longitudinal plane a cam follower roller 79 which is mounted on an axle having its outer ends carried by the opposed parallel chains. This cam follower roller 79 is positioned in a cam slot or track 80 (FIGURES 9 and 10) formed in a vertically-disposed crosshead or arm 81 which is mounted for movement in a vertical plane extending longitudinally midway between the parallel sprocket chains 78. The arm 81 is rigidly connected to the ram beam 35, adjacent to but spaced from the forward or leading end thereof, and depends therefrom to a level substantially below the lower runs of the sprocket chains 78, as indicated in FIGURE 10. The upper end of the arm 81 may be rigidly bolted to the ram beam 35 by means of the bolts 82 or be rigidly secured thereto in any other suitable manner. The cam slot 80 in the arm or yoke 81 extends generally vertically of the arm but is of special outline, as will be later pointed out, to obtain desired controlled reciprocation of the ram 35. The slot 80 includes an upper vertical section **80*a* and a lower vertical section 80*b* which is shorter, the two sections being offset in the plane of the yoke 81 relative to each other but being parallel and also being connected by an offset or inclined connecting section 80*c***.

The chain 78 will be of a length to obtain the desired extent of movement of the articles A along the slides 30 and this distance will correspond substantially to the distance between the axes of the shafts 70 and 73 (FIGURE 10) plus the radius of each of the respective sprockets 76 and 77. The articles will be supplied by any suitable conveyor arrangement, for example, one which may be associated with a palletizing machine. Assuming the articles include the pallets P, these will preferably be moved laterally onto the slides 30, ahead of the adjacent pusher bars 40, it being understood that the pusher bars, when in a common horizontal plane, are spaced apart a greater distance than the length of the pallets. This distance also corresponds to the length of the stroke imparted to the ram and will be substantially the same as the distance between the forward edge of any notch 47 and the forward edge of the ramp 49, in its normal downwardly-inclined position, at the notch 48 next ahead in that same guide rail 33. The distance between successive pusher bars 40 is always uniform regardless of their common plane vertical positions but at times the rail sections 50 may be actuated to prevent vertical movement of any selected bar. However, normally all the rollers 45 move simultaneously vertically to the same extent and position, all the pusher bars 40 in the same horizontal plane, as indicated in FIGURES 12 to 14.

If the drive motor 65 is operating at this time, a back and forth stroke of the above-indicated predetermined length will be imparted to the ram 35. This reciprocation will result from the cam-follower roller 79 traveling around with the endless chains 78. It will be understood from FIGURE 10 that as the roller 79 travels to the right of FIGURE 10, with the upper runs of the chains, a forward stroke is imparted to the ram whereas the roller travels to the left, a return or rearward stroke is imparted to the ram. This is due to the fact that the roller 79 is in the cam slot 80 in the yoke or arm 81 which is rigidly connected to the ram as indicated. As the roller 79 travels downwardly around the sprockets 76 to the level of the shaft 70, the forward movement of the ram comes gradually to a stop and then the movement of the ram is reversed to a rearward or retracting movement, as the roller moves on downwardly and rearwardly. Similarly, as the roller 79 travels upwardly around the sprockets 77, the retracting movement of the ram gradually comes to a stop and then the movement of the ram is gradually reversed to a forward movement. During the advancing or forward movement of the ram 35, the pusher bars 40 are swung upwardly into the plane of the pallets P, supported on the slides 30, so that they will engage therewith but during the retracting or rearward movement of the ram, the pusher bars 40 are swung downwardly into a lower plane where they will not engage the pallets.

The cooperative action of the ram 35 and the pusher bars 40 is illustrated generally in FIGURES 12–14 which are schematic and are used to disclose mainly the cooperation of the rollers 45 and the ramps 49. In these figures, the rail sections 50 are in their inoperative positions and need not be considered in the operation of the conveyor at this time. Assuming the ram 35 is moving in its forward or advancing stroke, the pusher bars 40 are raised to the level of the plane of the pallets P supported on the slides 30, being moved to this upper position by gravity, as previously indicated, since the control rollers 45 thereof are below the upper flange rails **33*a* of the rails 33 and will move therealong, as shown in FIGURE 12. As the ram advances, a roller 45 of each pusher bar mechanism will eventually engage a cooperating pivoted ramp 49 and will swing the ramp upwardly until the roller passes beyond the ramp at which time the ramp will swing downwardly again into contact with the associated stop 52. Now the ram 35 will start its return or retracting stroke and, as indicated in FIGURE 13, the indicated roller 45 of each pusher bar mechanism will ride up its cooperating inclined ramp and will move upwardly through the associated notch 48 in the rail 33 and eventually will roll on the upper surface of the flange 33*a*. This roller and ramp control arrangement for each pusher bar mechanism moves the pusher bars 40 from the level of the pallets P down to a position adjacent the rail flange 33*a*, as indicated in FIGURE 14, so that on the return stroke of the ram 35, the bars 40 will not contact with the pallets. When the ram 35 reaches the extent of its retracting stroke, each ramp-engaging roller 45 that is moved rearwardly over the flange 33*a* during the return stroke of the ram 35 will drop through the next rearwardly disposed notch 47** (FIGURE 4*a*) and the pusher bar 40 will be raised to a level corresponding to the plane of the pallets P supported on the slides 30, that is, the level shown in FIGURE 14. As previously indicated, the successive pusher bars 40 and the rollers 45 under these operating conditions when all the rail sections 50 (which alternate along both guide rails 33 with the ramp sections 49) are in inoperative positions, are spaced apart longitudinally on the ram a distance greater than the length of each of the pallets P to be moved. This distance corresponds substantially to the distance between the forward edge of a ramp 49 (in normal downwardly inclined position) and the forward edge of the slot 47 next behind that ramp. The stroke of the ram 35 will also correspond substantially to this distance.

FIGURES 15 and 16 are schematic figures which illustrate one arrangement for controlling the positioning of the rail sections 50 which will, in turn, control the positioning of the pusher bars 40. These figures show the rail sections 50 all at one side of the ram only, to facilitate explanation of their operation, but as described above, in the actual structure the successive sections 50 alternate from one side to the other.

In normal operation of the conveyor, as indicated above, the control roller 45 of each pusher bar mechanism will drop through the cooperating notch or slot 47 in the associated rail flange 33a at the end of the return stroke of the ram, since the rail section 50 will be in noninterfering position. As indicated, the stroke of the ram 35 will equal substantially the length of the flange section 33a extending between each pair of notches 47 and 48 plus the length of the ramp 49 in normal inclined position below the notch 48. Therefore, if any rail section 50 is moved into flush relationship with the end of the flange section 33a at the forward end of the associated notch 47, as shown in FIGURE 16 and in broken line position in FIGURE 8, the roller 45 which is riding on the flange rail section 33a ahead of that notch, during the return stroke of the ram, will not drop through that notch. Therefore, the pusher bar 40 which that roller controls will remain in its lower nonpushing position, as indicated in broken lines in FIGURE 8 and in FIGURE 16. Thus, the rail sections 50 may be selectively swung into roller-supporting position flush with the respective flange section 33a to prevent any selected pusher bar 40 from moving up to pallet-pushing position during the return stroke of the ram.

The movement of the supporting rail sections 50 into and out of position may be controlled in various ways such as by air, hydraulic, mechanical or electrical means and in FIGURES 15 and 16 one example of an electrical control arrangement is illustrated. In this example, solenoids 58 are illustrated and they may be controlled independently by manual switches to selectively move various pallets or articles, permitting control at merge points or discharge points. Also, the articles may be uniformly spaced by an automatic control arrangement of the type indicated in FIGURES 15 and 16. This arrangement may comprise the limit switches 58a, each of which is arranged to be engaged by a pallet P to control the pusher bar 40 that would ordinarily engage the next succeeding pallet. However, because of actuation of the limit switch, the pusher bar will not move into pallet-engaging position to move the succeeding pallet until the preceding pallet moves along. It should be understood that this control arrangement is given by way of example only and many other arrangements may be provided.

As previously indicated, the means for reciprocating the ram 35 is a modified crank and slotted crosshead mechanism. If the slot 80 in the crosshead or yoke 81 was a straight, vertical slot disposed at a right angle to a horizontal plane passing through the axes of the sprocket shafts 70 and 73, there would be a uniform crank motion produced as the roller 79, equivalent to a crank pin, passed around the outside curved edges of the respective sprockets 76 and 77 and operated in the vertical slot in engagement with the respective edges thereof. This would impart a simple, harmonic motion to the ram 35, but the upper and lower runs of the chains 78 would carry the pin 79 through a greater longitudinal distance during the retracting and advancing strokes of the ram and at its highest attained speeds. However, the uniform crank actions at the ends of the ram strokes, producing the simple, harmonic motion, is modified by providing in the lower portion of the slot 80, the offset or inclined section 80c previously described. This slot arrangement is mainly for the purpose of imparting controlled acceleration to the ram movement at the start of its pushing stroke to control the impact of engagement of the pusher bars 40 with the respective pallets P.

The roller 79 travels through an oval path extending longitudinally of the conveyor and in a vertical plane. Each of the horizontal components and vertical arcuate end components of this movement is a function of this particular path and thus controlled acceleration and deceleration of the ram 35 is provided. The roller 79 traveling in the true horizontal paths imparts a direct speed ratio of horizontal movement to the ram the same as the horizontal chain travel. Since the double chains 78 are of such length that the horizontal movement is greater than the length of an article being moved, in order to allow the pusher bars 40 to move up from a nonengagement position into engagement position, some impact results when each pusher bar 40 engages the respective pallet P. For this reason, the cam slot 80 of the yoke or arm 81, or its follower-engaging edge, rather than being straight and vertical is provided with the offset configuration to decrease the speed of the pusher bar 40 just prior to and at the instant it engages the pallet P, so as to reduce the shock of impact to a minimum. This action is evident from an inspection of the schematic showing of FIGURE 11 where the yoke 81 is shown adjacent the sprocket 77. It will be noted that the offset 80c is located below the previously-mentioned, horizontal plane passing through the axes of the shafts 73 and 70. As the roller 79 starts to swing upwardly around the axis of the shaft 73, near the end of the reversing or retracting stroke of the ram 35, it moves from engagement with the straight rear edge *b* of the straight lower section 80b of the cam slot, into engagement with the opposed or forward edge *c* of the offset section 80c of the cam slot, thereby interrupting the rearward movement of the ram 35, which would otherwise continue until the roller 79 reached the said horizontal plane, and gradually starting its forward or pushing movement. This forward movement is slow because the edge *c* is rearwardly inclined, but after the roller 79 moves up above the horizontal plane onto the vertical edge *a* at the forward edge of the straight section 80a of the cam slot, the motion will be the usual crank motion with gradually increasing speed imparted to the ram 35 until the maximum is reached, at which time the roller 79 will continue to travel with the horizontal upper runs of the pair of chains 78. Impact of each pusher bar 40 with the respective pallet P will be during the time the roller 79 is approximately at the level of sprocket shafts 73 and 70 and as it moves from the offset section 80c of the cam slot 80 into the straight upper section 80a of the cam slot, which will result in a slower forward movement of the ram 35, thereby reducing impact of the pusher bar 40 and the respective pallet P to a minimum. The action at the other end of the chain drive as the roller 79 swings downwardly around the sprocket 76 is not important but there will be a gradual deceleration of the ram until the roller 79 reaches said horizontal plane at which time there will be an increased acceleration in the retracting movement of the ram but at this time the pusher bars will be out of engagement with the associated pallets.

The conveyor described above has been disclosed as having the pivoted ramp structures 49 and the pivoted rail sections 50 alternating with each other at opposite sides of the ram. However, the conveyor may be used simply as a transporting conveyor without the use of the pivoted rail sections 50 and the means for controlling those sections. In that case, it would only be necessary to use one guide rail for cooperating with the pusher bar control rollers which would all be at the corresponding side along with the pivoted control ramps. Although this structure is not shown in detail in the drawings, the arrangement would be apparent from the schematic illustrations in FIGURES 17–19.

Parts in FIGURES 17–19 which correspond to parts of the conveyor previously described are designated by the same reference characters, each with the prefix "1." The operation will be apparent from the preceding description of the normal operation of the first described form of the conveyor with the rail sections 50 in their rearward positions, as illustrated in FIGURES 12–14. The pivoted ramps 149 all at the one side of the ram 135 will cooperate with the control rollers 145 of the pusher bars 140 which are also all at that side. As indicated in FIGURE 17, as the ram moves forwardly, the rollers 145 travel beneath the rail flanges 133*a*, until they engage the respective ramps 149 to lift them and move beyond them. During this forward travel of the ram, the pusher bars 140 are in engagement with the pallets P. As the ram is retracted, the rollers 145 travel up the ramps 149, as indicated in FIGURE 18, and are moved downwardly out of engagement with the pallets. During the continued retracting movement of the ram, the rollers 145 travel on the upper surface of the flange 133*a* and hold the pusher bars 140 at a lower level out of engagement with the pallets, as indicated in FIGURE 19. As the ram reaches the extent of its retracting movement, the respective rollers 145 drop through their associated slots 148 to raise the pusher bars 140 again to pallet-engaging level ready for the advancing stroke of the ram. It is preferred that the ramp 149 in its normal position be behind the forward edge of the associated notch 148 a distance approximating that of the diameter of a roller 145. The stroke of the ram, in this form of the conveyor, corresponds substantially to the distance between the forward lower edge of the pivoted ramp 149, in its normal position, and the forward edge of the notch 148 next behind it.

It will be apparent from the above description that this invention provides a ram-type pusher conveyor which may be readily controlled to push all articles or certain articles associated therewith. The ram is driven and controlled in a novel manner to obtain the proper pushing and retracting strokes. Also, the pusher bars carried by the ram are controlled effectively during reciprocation of the ram to be moved into engagement with the articles at the proper instant during the forward or pushing stroke and to be moved into a nonengaging position during the return or retracting stroke of the ram. The preferred driving means for the ram which is disclosed is such that the speed of movement of the ram in its pushing stroke is controlled just prior to and at impact of the pusher bars with the respective articles to reduce impact forces to a minimum.

Various other advantages will be apparent from the preceding description, the drawings, and the following claims.

Having thus described this invention, what is claimed is:

1. A conveyor comprising longitudinally-extending supports for receiving and supporting articles to be moved therealong, means for moving the articles along said supports, said means comprising a ram extending along said supports in cooperative relationship therewith, means for reciprocating the ram relative to said supports, article-engaging members carried by said ram and movable thereon between article-engaging and nonengaging positions, and means cooperating with said ram and actuated by movement thereof to move said article-engaging members between said positions, said means for reciprocating said ram comprising a yoke rigidly connected to said ram and crank means for engaging said yoke, said yoke having a cam slot therein which extends generally transversely relative to said ram, said crank means comprising a crank pin engaging said slot and carried by means for moving it in a closed path in a plane extending in the same general direction as the plane of the yoke, said crank slot having an offset section to cooperate with said pin to decrease the speed of movement of the ram at the time of engagement of said article-engaging members with the articles.

2. A conveyor according to claim 1 in which said ram has a longitudinal axis and is mounted for movement along said axis, and said crank pin is in the form of a roller disposed in said cam slot, said cam slot extending generally at a right angle to said ram axis but having the offset section intermediate its ends, said crank pin moving means comprising an endless flexible drive structure carrying said pin and extending generally in the same direction as said ram axis.

3. A conveyor according to claim 2 in which said crank pin is in the form of a cam follower roller disposed in said cam slot of the yoke, said crank pin moving means comprising a pair of endless flexible sprocket chains passing around sprockets having their axes disposed transversely relative to said ram axis, and carrying said roller therebetween for movement therewith, said yoke being located between the chains of the pair for movement longitudinally of the chains.

4. A conveyor comprising supports having longitudinally-extending horizontally-disposed supporting surfaces for receiving and supporting articles to be moved therealong, means for moving the articles along said surfaces, said means comprising an elongated ram disposed in cooperative relationship with said supports below said supporting surfaces with a longitudinal axis disposed parallel to said supporting surfaces, means for mounting said ram for reciprocable movement along said axis and relative to said supporting surfaces, article-engaging members carried by said ram at longitudinally-spaced intervals for vertical movement between upper article-engaging and lower article-nonengaging positions, means supported along said supporting surfaces and actuated by movement of the ram to move said article-engaging members vertically between said positions, said means for reciprocating said ram comprising a yoke rigidly depending from said ram in a vertical plane common with said ram axis, said yoke having a cam slot extending vertically therealong, and crank means including a cam follower in engagement with said slot and movable substantially in said vertical plane in a closed path extending longitudinally of said axis, said cam slot having upper and lower straight sections with an offset connecting section provided to reduce the speed of movement of the ram at the time of engagement of said article-engaging members with said articles.

5. A conveyor according to claim 4 in which said cam follower is carried by an endless flexible drive means extending generally in the direction of said ram axis and which moves said follower in said vertical plane.

6. A conveyor according to claim 5 in which said endless flexible drive means comprises a pair of endless sprocket chains extending longitudinally of the ram with said yoke depending therebetween, said cam follower being in the form of a roller carried on an axis extending transversely between said chains, said sprocket chains passing around sprockets which are rotatable about transverse axes disposed in longitudinally-spaced relationship relative to said ram axis.

7. A conveyor according to claim 6 in which the offset connecting section of said cam slot is located below a horizontal plane passing through the transverse axes of said sprockets.

8. A conveyor according to claim 4 in which said article-engaging members comprise pusher bars carried above the ram and extending transversely thereof, means for pivoting said pusher bars to said ram for vertical swinging movement, said means for moving the article-engaging members vertically comprising cam means supported at longitudinally spaced intervals along said horizontal supporting surfaces and engageable with cam followers connected to said pusher bars.

9. A conveyor according to claim 8 including a rail extending along said supporting surfaces in parallel relationship thereto with which said cam followers will engage by gravity, said rail having openings at longitudinally-spaced intervals through which said cam followers may pass vertically during reciprocation of said ram, said cam means comprising ramp members freely pivoted to said rail at said openings to normally extend downwardly and forwardly below the rail, so that the cooperating cam follower operating beneath the rail will lift the ramp and move beyond it during the forward stroke of the ram and will climb the ramp to operate above the rail during the return stroke of the ram.

10. The combination of claim 9 in which a pair of the rails are provided with the two rails thereof located on opposite sides of the ram in parallel relationship thereto, said means for pivoting the pusher bars comprising a yoke carrying each pusher bar and straddling the ram to which it is pivoted for vertical swinging movement, said yoke carrying one of said cam followers in the form of a cam roller at one side of said ram for cooperating with the adjacent rail, each of said rails having the openings formed therein with the pivoted ramps associated therewith.

11. The combination of claim 10 in which the one rail is provided with a pivoted rail section substantially opposite each pivoted ramp section on the opposed rail and with an associated opening through which the cam roller on the corresponding side of a cooperating yoke can normally drop, said pivoted rail section being movable into cooperation with the rail at that opening to prevent dropping of the roller therethrough.

12. The combination of claim 11 including means for controlling movement of the rail sections into cooperation with the associated rails.

13. A conveyor comprising supports having longitudinally-extending horizontally-disposed supporting surfaces for receiving and supporting articles to be moved therealong, means for moving the articles along said surfaces, said means comprising an elongated ram disposed in cooperative relationship with said supports below said supporting surfaces with a longitudinal axis disposed parallel to said supporting surfaces, means for mounting said ram for reciprocable movement along said axis and relative to said supporting surfaces, article-engaging members carried by said ram at longitudinally-spaced intervals for vertical movement between upper article-engaging and lower article-nonengaging positions, means supported along said supporting surfaces and actuated by movement of the ram to move said article-engaging members vertically between said positions, said article-engaging members comprising pusher bars carried above the ram and extending transversely thereof, means for pivoting said pusher bars to said ram for vertical swinging movement, said means for moving the article-engaging members vertically comprising cam means supported at longitudinally-spaced intervals along said horizontal supporting surfaces and engageable with cam followers connected to said pusher bars, a rail extending along said supporting surfaces in parallel relationship thereto with which said cam followers will engage by gravity, said rail having openings at longitudinally-spaced intervals through which said cam followers may pass vertically during reciprocation of said ram, said cam means comprising ramp members freely pivoted to said rail at said openings to normally extend downwardly and forwardly below the rail, so that the cooperating cam follower operating beneath the rail will lift the ramp and move beyond it during the forward stroke of the ram and will climb the ramp to operate above the rail during the return stroke of the ram.

14. A conveyor according to claim 13 in which a pair of the rails are provided with the two rails thereof located on opposite sides of the ram in parallel relationship thereto, said means for pivoting the pusher bars comprising a yoke carrying each pusher bar and straddling the ram to which it is pivoted for vertical swinging movement, said yoke carrying one of said cam followers in the form of a cam roller at one side of said ram for cooperating with the associated rail, each of said rails having the openings formed therein with the pivoted ramps associated therewith.

15. The combination of claim 14 in which the one rail is provided with a pivoted rail section substantially opposite each pivoted ramp section on the opposed rail and with an associated opening through which the cam roller on the corresponding side of a cooperating yoke can normally drop, said pivoted rail section being movable into cooperation with the rail at that opening to prevent dropping of the roller therethrough.

16. A conveyor according to claim 15 including means for controlling movement of the rail sections into cooperation with the associated rails.

17. The combination of claim 15 in which the successive pusher bars are spaced apart longitudinally on the ram a distance greater than the length of each of the supported articles to be moved, said cam rollers carried by the yokes of the successive pusher bars being substantially correspondingly spaced, said successive openings in the rail at each side of the ram being substantially correspondingly spaced.

18. The combination of claim 17 in which the pivoted ramp members and the pivoted rail sections alternate with each other along both rails, the pivoted ramp members on one rail being substantially transversely opposite the pivoted rail sections along the other rail.

19. A conveyor comprising supports having longitudinally-extending horizontally-disposed supporting surfaces for receiving and supporting articles to be moved therealong, means for moving the articles along said surfaces, said means comprising an elongated ram disposed in cooperative relationship with said supports below said supporting surfaces with a longitudinal axis disposed parallel to said supporting surfaces, means for mounting said ram for reciprocable movement along said axis and relative to said supporting surfaces, article-engaging members carried by said ram at longitudinally-spaced intervals for vertical movement between upper article-engaging and lower article-nonengaging positions, and means supported along said supporting surfaces and actuated by movement of the ram to move said article-engaging members vertically between said positions, said article-engaging members comprising pusher bars carried above the ram and extending transversely thereof, means for pivoting said pusher bars to said ram for vertical swinging movement, said means for moving the article-engaging members vertically comprising cam means supported at longitudinally spaced intervals along said horizontal supporting surfaces and engageable with cam followers connected to said pusher bars, a rail extending along said supporting surfaces in parallel relationship thereto with which said cam followers will engage by gravity, said rail having openings at longitudinally-spaced intervals through which said cam followers may pass vertically during reciprocation of said ram, said cam means comprising ramp members freely pivoted to said rail at said openings to normally extend downwardly and forwardly below the rail, so that the cooperating cam follower operating beneath the rail will lift the ramp and move beyond it during the forward stroke of the ram and will climb the ramp to operate above the rail during the return stroke of the ram.

20. The combination of claim 19 in which a pair of the rails are provided with the two rails thereof located on opposite sides of the ram in parallel relationship thereto, said means for pivoting the pusher bars comprising a yoke carrying each pusher bar and straddling the ram to which it is pivoted for vertical swinging movement, said yoke carrying one of said cam followers in the form of a cam roller at one side of said ram for cooperating with the adjacent rail, each of said rails having the openings formed therein with the pivoted ramps associated therewith.

21. The combination of claim 20 in which the one rail is provided with a pivoted rail section substantially opposite each pivoted ramp section on the opposed rail and with an associated opening through which the cam roller on the corresponding side of a cooperating yoke can normally drop, said pivoted rail section being movable into cooperation with the rail at that opening to prevent dropping of the roller therethrough.

22. The combination of claim 21 including means for controlling movement of the rail sections into cooperation with the associated rails.

23. The combination of claim 21 in which the successive pusher bars are spaced apart longitudinally on the ram a distance greater than the length of each of the supported articles to be moved, said cam rollers carried by the yokes of the successive pusher bars being substantially correspondingly spaced, said successive openings in the rail at each side of the ram being substantially correspondingly spaced.

24. The combination of claim 23 in which the pivoted ramp members and the pivoted rail sections alternate with each other along both rails, the pivoted ramp members on one rail being substantially transversely opposite the pivoted rail sections along the other rail.

References Cited by the Examiner

UNITED STATES PATENTS

| | | | |
|---|---|---|---|
| 1,437,410 | 12/1922 | Evans. | |
| 1,446,594 | 2/1923 | Stadler. | |
| 1,631,125 | 6/1927 | Happel | 198—221 X |
| 3,127,981 | 4/1964 | Sharpe | 198—221 |

EVON C. BLUNK, *Primary Examiner.*

EDWARD A. SROKA, *Examiner.*